United States Patent

Chen

[15] 3,652,952

[45] Mar. 28, 1972

[54] ELECTRONICALLY VARIABLE LINE BUILD-OUT NETWORK

[72] Inventor: William I-Hsuan Chen, Laurence Harbor, N.J.

[73] Assignee: Bell Telephone Laboratories, Incorporated, Murray Hill, N.J.

[22] Filed: May 19, 1970

[21] Appl. No.: 38,752

[52] U.S. Cl. ....................................330/57, 330/21, 333/18, 333/23

[51] Int. Cl. ..........................................................H03f 3/60

[58] Field of Search ...............179/16 E, 16 F, 15 AD, 170 R, 179/170 D, 170 E; 333/18, 23, 28 R, 28 A, 81; 330/53, 57

[56] References Cited

FOREIGN PATENTS OR APPLICATIONS 1,800,545 10/1968 Germany...........................179/15 AD

*Primary Examiner*—Kathleen H. Claffy

*Assistant Examiner*—Randall P. Myers

*Attorney*—R. J. Guenther and E. W. Adams, Jr.

[57] ABSTRACT

A variable line build-out network for simulating cable lengths from substantially zero feet to L feet having at least two parallel paths each having a different transmission loss characteristic. In a two path line build-out network embodying the invention, the first path has an amplifier having gain X followed by a section of cable of length L, or an RC network to simulate the characteristics of such a section of cable but having no delay, and produces in response to an input pulse an output having two components; the first being identical in shape to the input pulse but of reduced amplitude ($X < 1$) and the second component representing the distortion introduced by a section of cable of length XL. The second path has an amplifier of gain $1 - X$ and where a section of cable was employed in the first path, a pure delay circuit in series therewith. When the outputs of the two paths are combined, the result is a pulse whose shape is identical to that which would have been produced if the input pulse had been transmitted through a cable of length XL.

5 Claims, 3 Drawing Figures

INVENTOR
W. I. H. CHEN
BY Leonard D. Arnold
ATTORNEY

ELECTRONICALLY VARIABLE LINE BUILD-OUT NETWORK

BACKGROUND OF THE INVENTION

In pulse transmission systems repeaters are employed at intervals along the transmission line to regenerate the transmitted signal. Each repeater employs an equalizer to compensate for the attenuation characteristics of the cable and the equalizer is designed for a specific maximum repeater spacing. The repeaters may not be more than that predetermined distance apart but, frequently, due to the necessity of locating the repeaters at certain geographic locations, they are closer together than the predetermined maximum distance. In such a situation, it is necessary to make up the difference between the actual cable length and the maximum predetermined spacing by means of a line build-out network whose transmission characteristics closely match those of the missing lengths of cable.

In the past, lumped R,L,C components have been used for line build-out networks but these lumped circuits have been limited by their complexity in both bandwidth and accuracy. Even a sophisticated lumped network, such as that disclosed in copending application, Ser. No. 693,452 filed on Dec. 26, 1967, by R. A. Tarbox, now U.S. Pat. No. 3,568,100, is inherently inaccurate because it attempts to accomplish variation in simulated length through the control of a single resistive value by some nonlinear control law. Due to this nonlinearity, they cannot be accurately set. Furthermore, it is desirable to not only be able to make an accurate setting of a line build-out network but it is further desirable to have a line build-out network which can be varied so that, as the temperature of the cable changes, thereby changing its effective length, the line build-out network can be adjusted to compensate for this change in effective length.

It is therefore an object of the present invention to eliminate the inaccuracies associated with prior art line build-out networks and, in addition, eliminate the inaccuracy of control heretofore encountered so that the line build-out network can be accurately adjusted by means of an external control voltage.

SUMMARY OF THE INVENTION

In accordance with this invention the line build-out network comprises at least two parallel paths, each having a different transmission loss characteristic. In a two path line build-out network embodying the invention, the first path contains a precisely controllable, yet simple, amplifier having a gain X followed by a section of cable of length L, or an RC network simulating such a cable but having no delay. In response to an input pulse this first path produces an output pulse having two components; the first being identical in shape to the input pulse but of reduced amplitude ($X < 1$) and the second component being the distortion introduced by a section of cable of length XL. The second parallel path employs another precisely controllable, yet simple, variable gain amplifier having a gain $1 - X$ and, if the first path contained a section of cable of length L, a pure delay. As will be mathematically demonstrated below, when the outputs of the two paths are combined, the result is a pulse identical to that which would have been produced if the input pulse had been transmitted through a cable of length XL.

BRIEF DESCRIPTION OF THE DRAWING

The invention will be more readily understood from the following detailed description, taken in conjunction with the following drawings in which.

DETAILED DESCRIPTION

The function of a line build-out network is to compensate for a length of cable which is equal to the difference between the predetermined maximum repeater spacing and the actual repeater spacing. The general characteristic of a transmission line is $$F(S) = e^{-\sqrt{S}} \qquad (1)$$

The transfer characteristic of the section of cable to be simulated is given by the following equation:

$$H(X,S) = e^{-X\sqrt{S}} \qquad (2)$$

Figure 1:
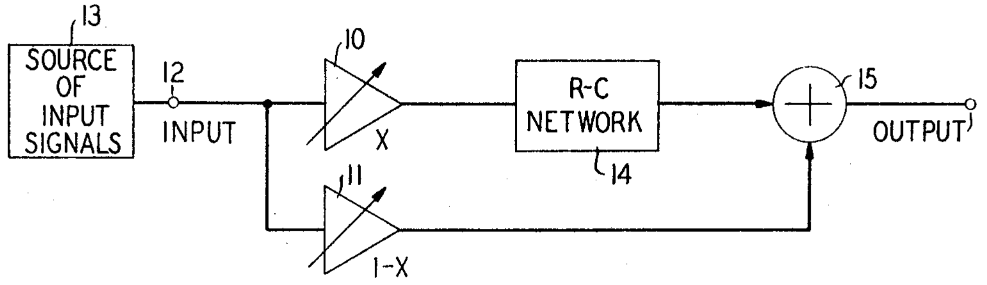
FIG. 1 is a block diagram of an electronically variable line build-out network embodying the present invention.

A block diagram of line build-out network embodying the present invention is shown in FIG. 1. It consists of two variable gain amplifiers 10 and 11 connected in parallel to receive an input signal at input terminal 12 from a source of signal 13. The output of amplifier 10 is connected to an RC network 14 having an attenuation characteristic the same as a section of cable but having no delay associated therewith. The output of amplifier 11 and the output of the rc network are connected to the inputs of a summing circuit 15 whose output is the output of the line build-out network.

The transfer characteristic of a generalized network of this class is given by the following equation:

$$T(X,S) = \sum_{n=0}^{N} f_n(X) e^{-nk\sqrt{S}} \qquad (3)$$

By expanding equations (2) and (3) in Taylor series in the variable $\sqrt{S}$ and equating the leading coefficients of the first N terminals, the following equation is obtained:

$$\begin{bmatrix} 1 \\ X \\ X^2 \\ \cdot \\ \cdot \\ \cdot \\ X^N \end{bmatrix} = \begin{bmatrix} 1 & 1 & 1 & \cdots & 1 \\ 0 & 1 & 2 & \cdots & N \\ 0 & 1 & 2^2 & \cdots & N^2 \\ \cdot & \cdot & \cdot & & \cdot \\ \cdot & \cdot & \cdot & & \cdot \\ \cdot & \cdot & \cdot & & \cdot \\ 0 & 1 & 2^N & \cdots & N^N \end{bmatrix} \begin{bmatrix} f_0(X) \\ f_1(X) \\ f_2(X) \\ \cdot \\ \cdot \\ \cdot \\ f_N(X) \end{bmatrix} \qquad (4)$$

Equation (4) has the solution:

$$f_n(X) = \prod_{\substack{m=0 \\ m \neq n}}^{N} \frac{X-m}{n-m} \qquad (5)$$

An estimate of the error in approximating Equation (2) by Equation (3) is given by the equation:

$$\epsilon_{N+1} = \left[ \prod_{m=0}^{N} (x-m) \right] \frac{(-1)^{N+1}(k\sqrt{S})^{N+1}}{(N+1)!} \qquad (8)$$

Equation (5) gives the required gain settings of a general N+1 path variable line build-out structure and therefore the gain settings of the two-path structure are determined by setting N=1. The maximum length of cable which can be simulated by the two-path circuit of FIG. 1 is L.

The above equations provide a mathematical proof that the circuit shown in FIG. 1 simulates a predetermined length of cable, XL, but a physical explanation of the operation is also possible, as follows. The first path, comprising the amplifier 10 having a gain X and the RC network operates upon an input pulse to produce an output pulse containing two components. The first is identical in shape to the input pulse except that it has an amplitude equal to X times the input pulse. The second component is equal to the distortion introduced by the length of cable L represented by the RC network 14 after amplification of the pulse by X where X < 1. The effect of multiplying the input pulse by X is to produce a distortion component in the output of the first path equal to the distortion produced by a cable of length XL. The output of the lower path comprising the second amplifier, having a gain of 1 − X, is a pulse having 1 − X times the amplitude of the input pulse. When the two outputs are added together, the result is a pulse having two components. The first component is identical in shape and amplitude to the original input pulse but the second component is the distortion introduced by a section of cable of length XL which is the desired length of cable to be simulated.

Figure 2:
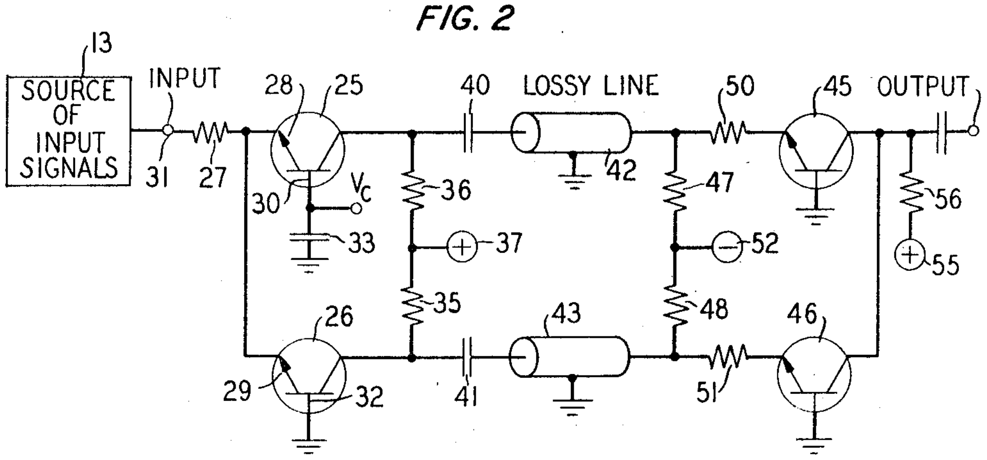
FIG. 2 is a schematic diagram of a second electronically variable line build-out network embodying the present invention.

A second embodiment of the invention is shown in FIG. 2. Here, two grounded base transistor amplifiers 25 and 26 have their emitters 28 and 29 connected through a resistor 27 to an input terminal 31. A control voltage is applied to the base electrode 30 of the first transistor 25. As a result, the current flowing through resistor 27 is divided between the emitters 28 and 29 of transistors 25 and 26, respectively, so that if X current flows into the emitter 28 then 1 − X current flows into emitter 29 with the control voltage $V_c$ operating solely to change the value of X. The base electrode 30 of transistor 25 is connected to ground through a capacitor 33 while the base electrode 32 of transistor 26 is directly connected to ground. A collector-emitter bias voltage is maintained on each transistor by means of resistors 35 and 36 which are connected between a source of positive voltage 37 and the collector electrode. Blocking capacitors 40 and 41 connected to the collector electrodes of transistors 25 and 26, respectively, prevent the passage of DC current to the following components.

A section of length L of cable 42 which is deliberately chosen to be lossy is connected to capacitor 40 while a section of cable having a delay equal to that encountered in a length of cable L but providing no other attenuation is connected to the output of capacitor 41. The signals present at the output of cable sections 42 and 43 are applied to emitters of combining transistor amplifiers 45 and 46 which are of the grounded base type. The proper emitter-collector bias voltage is maintained by means of a pair of biasing resistors 47 and 48 and 50 and 51 which connect a source of bias voltage 52 to the emitter electrodes of transistor 45 and 46, respectively. A positive voltage is applied from source 55 through resistor 56 to the collector electrode of each transistor.

The equations recited above are equally applicable to this circuit. The functional difference between FIG. 1 and FIG. 2 is that the lossy section of cable 42 has a delay associated with it so that in order to properly combine the signals from two paths, a pure delay, i.e., one having no attenuation, must be provided in the second path to match the delay in the first path. In FIG. 1, on the other hand, an RC network was used to simulate a section of cable of length L and such a network has no delay associated with it. The above-recited explanation as to the physical operation of the circuitry is equally applicable to FIG. 2.

Figure 3:
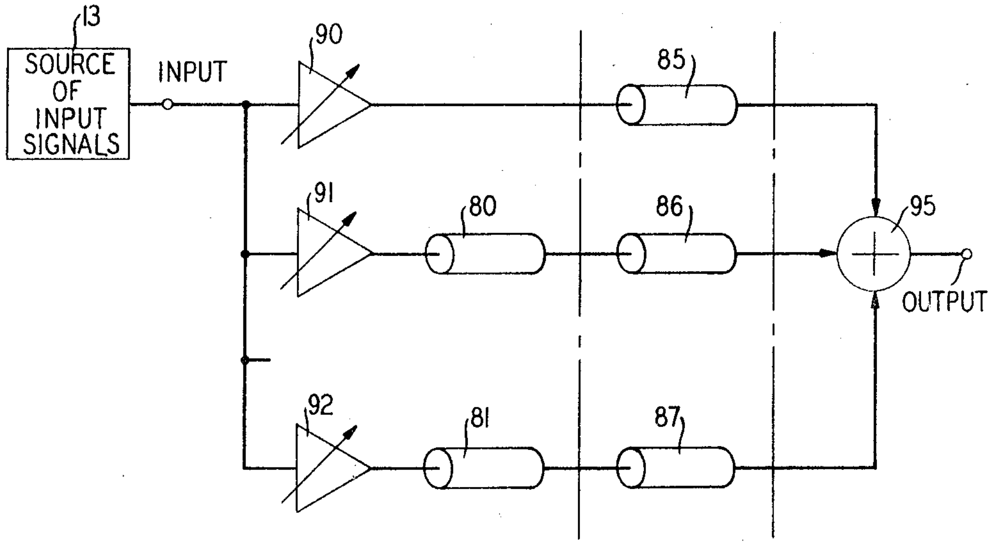
FIG. 3 is a block diagram of a third electronically variable line build-out network embodying the present invention.

Apparatus embodying this invention is not limited to circuits employing two paths. The equations stated above apply to multiple path networks as shown in FIG. 3 wherein each path other than the first contains a cable 80...81 having a length O,L or some multiple of length L together with a length of cable 85, 86...87 having associated therewith a pure delay. The first path contains the amplifier 90 and only the section of cable 85 having a pure delay with no other attenuation associated therewith. The other paths contain an amplifier 91...92 together with the two previously mentioned sections of cable. As shown in FIG. 3, the addition of these signals from the multiple paths in accomplished in an adder circuit 95 and, as has been demonstrated mathematically above, such a circuit is capable of simulating cables of length NL. Cable 80...81 may be replaced by RC networks having no delay. In such a case cables 85, 86...87 may be eliminated. Sometimes repeaters are too far apart. In such situations it is desirable to reduce the effective length of the cable between these repeaters. In accordance with this invention, this may be accomplished by employing the circuit shown in FIG. 1 wherein the RC network 14 has a gain and phase shift opposite to that of a cable of length L. Applying the teaching and equations heretofore stated the apparatus may then be adjusted to electronically subtract a length of cable XL so that is appears to the apparatus as though the cable length between repeaters is equal to the actual cable length reduced by XL.

It is to be understood that the above-described arrangements are merely illustrative of the application of the principles of the invention. Numerous other arrangements may be devised by those skilled in the art without departing from the spirit and scope of the invention.

What is claimed is:

1. A multiple path electronically variable line build-out network comprising, in combination, a first path containing an amplifier connected to receive input signals from a source of signals, a second path containing an amplifier in series with an RC network simulating a cable of length L the input of said amplifier in said second path being connected to receive said input signals, a third path containing an amplifier in series with an RC network simulating a cable of length 2L the input of said amplifier in said third path being connected to receive said input signals, and additional paths each such additional path containing an amplifier in series with an RC network simulating a cable of length NL the input of said amplifier being connected to receive said input signals where N is the number of multiple paths including such additional paths less 1 and the gain of the amplifiers is determined by the equation:

$$f_n(X) = \prod_{\substack{m=0 \\ m \neq n}}^{N} \frac{X-m}{n-m}$$

where X is the independent variable, N is the total number of controlled gain amplifiers less 1, $f_n(X)$ is the gain of the $n^{th}$ amplifier as a function of X and $m$ is the dummy variable and adder means to combine the output of each path.

2. A multiple path electronically variable line build-out network comprising, in combination, a first path containing an amplifier in series with a section of cable providing delay the input of said amplifier being connected to receive signals from a source of signals, a second path containing an amplifier in series with a section of cable of length L and a section of cable providing delay, the input of said amplifier in said second path being connected to receive said signals from said source, a third path containing an amplifier in series with a section of cable of length 2L and a section of cable providing delay the input of said amplifier in said third path being connected to receive said signals from said source, additional paths each containing an amplifier in series with a section of cable of length NL and a section of cable providing delay the input of each said amplifier being connected to said source, where N is the number of multiple paths including such additional path less 1 and the gain of the amplifiers is determined by:

$$f_n(X) = \prod_{\substack{m=0 \\ m \neq n}}^{N} \frac{X-m}{n-m}$$

where X is the independent variable, N is the total number of controlled gain amplifiers less 1, $f_n(X)$ is the gain of the $n^{th}$ amplifier as a function of X and $m$ is the dummy variable and adder means to combine the output of each path.

3. A variable line build-out network for a digital transmission system to simulate a cable of length XL comprising, in combination, an input terminal connected to receive digital signals, a summing point, a first transmission path between said input terminal and said summing point having an amplifier of gain X whose input is connected to said input terminal and whose output is connected to an RC network simulating a cable of length L and having no delay whose output is connected to said summing point, and a second transmission path between said input terminal and said summing point having an amplifier of gain (1 − X) so that the transfer characteristic between said input terminal and said summing point is (substantially identical to) approximated by the following equation ($H(X,S) = e^{-X\sqrt{S}}$) $H(X,S) = e^{-X\sqrt{S}}$ where $H(X,S)$ is the transfer characteristic of a section of cable of length X.

4. A variable line build-out network for a digital transmission system to simulate a cable of length XL comprising, in combination, an input terminal connected to receive pulse signals, a summing point, a first transmission path between said input terminal and said summing point having an amplifier of gain X whose input is connected to said input terminal and whose output is connected to a predetermined section of cable of length L whose output is connected to said summing point, and a second transmission path between said input terminal and said summing point having an amplifier gain (1 − X) so that the transfer characteristic between said input terminal and said summing point is (substantially identical to) approximated by the following equation ($H(X,S) = e^{-X\sqrt{S}}$) $H(X,S) = e^{-X\sqrt{S}}$ where $H(X,S)$ is the transfer characteristic of a section of cable of length X.

5. A multiple path electronically variable line build-out network comprising, in combination, a first path containing an amplifier connected to receive input signals from a source of signals, a second path containing an amplifier in series in an RC network having a gain and phase characteristic opposite that of a cable of length L, the input of said amplifier in said second path being connected to receive said input signals, a third path containing an amplifier in series with an RC network having a gain and phase shift opposite that of a cable of length 2L the input of said amplifier in said third path being connected to receive said input signals, and additional paths each such additional path containing an amplifier in series with an RC network having a gain and phase shift opposite that of a cable of length NL the input of each said amplifier being connected to receive said input signals where N is the number of multiple paths including such additional paths less 1 and the gain of the amplifiers is determined by the equation:

$$f_n(X) = \prod_{\substack{m=0 \\ m \neq n}}^{N} \frac{X-m}{n-m}$$

where X is the independent variable, N is the total number of controlled gain amplifiers less 1, fhd n(X) is the gain of the $n^{th}$ amplifier as a function of X and $m$ is the dummy variable and adder means to combine the output of each path.

* * * * *